3,343,877
SUBAQUEOUS MINING
Thomas H. Oster, 156 S. Franklin St.,
Dearborn, Mich. 48124
No Drawing. Filed June 1, 1965, Ser. No. 460,566
3 Claims. (Cl. 299—9)

ABSTRACT OF THE DISCLOSURE

This invention relates to a method of subaqueous mining in which the desired minerals are detached from the ocean bed and propelled to the surface in an unconfined stream of water.

---

This invention relates to a process and apparatus for the recovery of valuable minerals from the bottom of natural bodies of waters such as lakes, rivers and oceans. There has been a growing realization in recent years of the astronomical amounts of minerals which are available upon the bottoms of such bodies of water. Particular attention has been paid to material which has been concentrated upon the bottom of the ocean, both at shallow depths along the shore and at extreme depths. Reference is made to an article appearing in Engineering and Mining Journal, volume 166, No. 5, May 1965 at page 82 et seq. for an illuminating discourse upon the extent and availability of these subaqueous resources.

It is conventional in subaqueous mining to dislodge material from the bottom of a body of water by a dredging head and to propel the material so dislodged to the surface through a pipe line connecting the dredge head and the surface facilities. The solids which are dislodged from the bottom are carried to the surface through this pipe by means of a stream of water derived directly from the body of water being dredged or mined. The necessity of maintaining this relatively rigid and fragile pipe line connection between the dredging head and the surface facilities has severely limited the use of this process to very shallow depths and to sheltered locations.

The object of this invention is the provision of a process for accomplishing such a mining operation in which the necessity for the pipe line connecting the dredging head and the surface facilities is eliminated. The absence of such a pipe line radically reduces the cost of such an apparatus and permits it to be operated at depths and under weather conditions which would not be possible with the conventional pipe connection.

This invention is based upon the fact that it is possible to direct an unconfined stream of water of substantial cross section and moderate velocity through a large body of water and have this unconfined stream of water travel substantial distances through the large body of water without loss of identity or velocity and with only slight mixing with the larger body of water. This unconfined stream of water acts precisely as though it were confined in an invisible pipe, although it is in reality moving as an infinitely large number of concentric cylinders, with the velocity of the stream decreasing very slightly from the center to the outside of the stream.

To conduct a subsurface mining operation it is only necessary to dislodge the material desired from the bottom of the body of water by a conventional dredging head which forms no part of this invention and to incorporate the material so discharged in an unconfined stream of water which is impelled to the vicinity of the surface in the absence of any interconnecting or confining pipe. Apparatus for creating a discrete vertical stream of water from a location near the bottom of a body of water to the vicinity of the surface is shown in my earlier Patent 2,991,622 granted July 11, 1961.

The stream of water should be directed in a substantially vertical direction and at a velocity greater than the settling velocity of the fastest settling body which it is desired to recover. The velocity of the unconfined stream of water should not be any greater than necessitated by the settling characteristics of the material to be recovered to conserve energy. The energy requirements increase as the cube of the velocity of the stream. The stream should be as close to vertical as possible, particularly on long lifts to avoid any tendency for the entrained minerals to settle to the edge of the stream. In very shallow operations a certain tilt from the horizontal can be tolerated since insufficient time will be allowed for the particles to settle out of the propelling stream.

The unconfined stream arriving at the surface from the bottom and carrying in suspension the desired minerals can be received in suitable processing equipment in a manner directly similar to that used when such minerals are conveyed in a stream of water confined in a pipe. The desired minerals are then separated from this stream by settling, filtering, centrifuging or other conventional methods with the major portion of the water which made up the stream being returned to the body of water from which it originated.

It is clear that if the process of separating the minerals from the bottom of the body of water does not reduce the minerals to a size sufficiently small to be lifted by an unconfined stream of water of moderate velocity, further deliberate comminution must be provided before the mineral is incorporated into the unconfined and surface bound stream.

I claim as my invention:
1. The process of subaqueous mining which comprises detaching desired mineral objects from the bottom of a natural body of water, said mineral objects having a specific gravity greater than unity, generating a substantially vertical unconfined stream of water, incorporating these mineral objects in said unconfined stream of water which stream of water is flowing in a vertical direction at a velocity at least as great as the settling velocity of the desired mineral objects, receiving this unconfined stream of water containing the entrained desired mineral objects at a location higher than their origin and separating the desired mineral objects from the stream of water.

2. The process of subaqueous mining which comprises detaching desired mineral objects from the bottom of a natural body of water, reducing the desired mineral objects in size, said mineral objects having a specific gravity greater than unity, generating a substantially vertical unconfined stream of water, incorporating these sized mineral objects in said unconfined stream of water which stream is flowing in a vertical direction at a velocity at least as great as the settling velocity of the desired mineral objects, receiving this unconfined stream of water containing the entrained sized mineral objects at a location higher than their origin and separating the desired mineral objects from the stream of water.

3. The process of subaqueous mining which comprises detaching desired mineral objects from the bottom of a natural body of water, said mineral objects having a specific gravity greater than unity, generating a substantially vertical unconfined stream of water, incorporating these mineral objects in said unconfined stream of water which stream of water is flowing in a vertical direction at a velocity at least as great as the settling velocity of the desired mineral objects, receiving this unconfined stream of water containing the entrained mineral objects at the surface level and separating the desired mineral objects from the stream of water.

References Cited

UNITED STATES PATENTS

| | | |
|---|---|---|
| 1,654,406 | 12/1927 | Bonner. |
| 2,132,800 | 10/1938 | Payton _____ 299—9 |
| 2,960,368 | 11/1960 | Watanabe _____ 302—14 |
| 3,295,231 | 1/1967 | Talbott _____ 37—78 |

ERNEST R. PURSER, *Primary Examiner.*